(12) United States Patent
McKenna et al.

(10) Patent No.: US 8,685,153 B2
(45) Date of Patent: Apr. 1, 2014

(54) ADSORBENT SYSTEM FOR REMOVAL OF GASEOUS CONTAMINANTS

(75) Inventors: Douglas B. McKenna, Avondale, PA (US); J. Anthony DelNegro, Wilmington, DE (US); Thomas Daley, Broomall, PA (US)

(73) Assignee: Micropore, Inc., Elkton, MD (US)

( * ) Notice: Subject to any disclaimer, the term of this patent is extended or adjusted under 35 U.S.C. 154(b) by 483 days.

(21) Appl. No.: 13/014,259

(22) Filed: Jan. 26, 2011

(65) Prior Publication Data

US 2011/0206572 A1 Aug. 25, 2011

Related U.S. Application Data

(60) Provisional application No. 61/298,426, filed on Jan. 26, 2010.

(51) Int. Cl.
*B01D 53/04* (2006.01)
(52) U.S. Cl.
USPC ............. 96/154; 128/205.28; 55/491; 55/512
(58) Field of Classification Search
USPC .......... 96/121, 147, 154; 95/139; 128/204.16, 128/205.12, 205.28; 55/491, 502, 512, 514
See application file for complete search history.

(56) References Cited

U.S. PATENT DOCUMENTS

| | | | |
|---|---|---|---|
| 2,038,071 A * | 4/1936 | Wilhelm | .......................... 96/118 |
| 2,395,842 A | 3/1946 | Borgstrom | |
| 2,629,652 A | 2/1953 | Schechter et al. | |
| 2,812,769 A | 11/1957 | Schaefer et al. | |
| 2,837,413 A | 6/1958 | Hay | |
| 3,034,655 A * | 5/1962 | York | .............................. 210/484 |
| 3,489,144 A | 1/1970 | Dibelius et al. | |
| 3,604,416 A | 9/1971 | Petrahai et al. | |
| 3,607,040 A | 9/1971 | Hervert et al. | |
| 3,755,535 A * | 8/1973 | Naber | ...................... 423/244.02 |
| 3,847,837 A | 11/1974 | Boryta | |
| 3,860,818 A | 1/1975 | Stalder et al. | |
| 3,909,206 A | 9/1975 | Katz | |
| 3,950,157 A * | 4/1976 | Matney | ........................... 55/490 |
| 4,153,661 A | 5/1979 | Ree et al. | |
| 4,168,706 A | 9/1979 | Lovell | |
| 4,234,326 A * | 11/1980 | Bailey et al. | ..................... 96/154 |
| 4,250,172 A * | 2/1981 | Mutzenberg et al. | ............. 442/6 |
| 4,255,175 A * | 3/1981 | Wilkins | ......................... 55/357 |
| 4,342,278 A | 8/1982 | Horan | |

(Continued)

FOREIGN PATENT DOCUMENTS

EP 0171551 2/1986
WO WO01/07114 2/2001

(Continued)

OTHER PUBLICATIONS

Battelle (Battelle News Release: Naval Sea Systems Command Issues Submarines Life-Saving Lithium Hydroxide Curtains Developed by Battelle) Apr. 6, 2004 http://www.battelle.org/news/04/4-06-04LithCurtain.stm, 2 pgs.

(Continued)

*Primary Examiner* — Frank Lawrence, Jr.
(74) *Attorney, Agent, or Firm* — Fish & Richardson P.C.

(57) ABSTRACT

This invention relates to an adsorbent system, adsorbent cartridge, and external canister for removing gaseous contaminants from air or another gas.

21 Claims, 18 Drawing Sheets

(56) References Cited

U.S. PATENT DOCUMENTS

| | | | |
|---|---|---|---|
| 4,342,811 A | 8/1982 | Lopatin et al. | |
| 4,407,723 A | 10/1983 | MacGregor et al. | |
| 4,409,978 A | 10/1983 | Bartos | |
| 4,442,162 A | 4/1984 | Kuester | |
| 4,493,718 A * | 1/1985 | Schweizer | 55/491 |
| 4,508,700 A | 4/1985 | Hoshiko | |
| 4,553,983 A | 11/1985 | Baker | |
| 4,559,066 A | 12/1985 | Hunter et al. | |
| 4,631,872 A | 12/1986 | Daroga | |
| 4,642,996 A | 2/1987 | Harris et al. | |
| 4,665,050 A | 5/1987 | Degen et al. | |
| 4,707,953 A | 11/1987 | Anderson et al. | |
| 4,781,184 A | 11/1988 | Fife | |
| 4,985,296 A | 1/1991 | Mortimer, Jr. et al. | |
| 5,082,471 A | 1/1992 | Athayde et al. | |
| 5,165,399 A | 11/1992 | Hochberg | |
| 5,332,426 A | 7/1994 | Tang et al. | |
| 5,338,516 A | 8/1994 | Zhang et al. | |
| 5,449,014 A | 9/1995 | Yan-ho | |
| 5,665,148 A | 9/1997 | Mühlfeld et al. | |
| 5,742,516 A | 4/1998 | Olcerst | |
| 5,879,423 A * | 3/1999 | Luka et al. | 55/482 |
| 5,964,221 A | 10/1999 | McKenna | |
| 6,176,897 B1 | 1/2001 | Keefer | |
| 6,192,633 B1 | 2/2001 | Hilbert | |
| 6,247,471 B1 | 6/2001 | Bower et al. | |
| 6,349,508 B1 | 2/2002 | Ju et al. | |
| 6,385,919 B1 | 5/2002 | McCarthy | |
| 6,428,680 B1 | 8/2002 | Kreichauf | |
| 6,565,627 B1 | 5/2003 | Golden et al. | |
| 6,699,309 B1 | 3/2004 | Worthington, II et al. | |
| 6,797,043 B2 | 9/2004 | Nalette et al. | |
| 6,862,529 B2 | 3/2005 | Brown et al. | |
| 6,893,483 B2 | 5/2005 | Golden et al. | |
| 7,077,891 B2 | 7/2006 | Jaffe et al. | |
| 7,109,853 B1 | 9/2006 | Mattson et al. | |
| 7,196,023 B2 | 3/2007 | Langley et al. | |
| 7,282,464 B2 | 10/2007 | Kimmel | |
| 7,326,280 B2 | 2/2008 | Hrycak et al. | |
| 7,329,307 B2 | 2/2008 | Hrycak et al. | |
| 7,395,936 B2 | 7/2008 | Knight | |
| 7,402,199 B2 * | 7/2008 | Maru | 96/149 |
| 7,407,533 B2 | 8/2008 | Steins | |
| 7,470,311 B2 * | 12/2008 | Sueoka et al. | 96/129 |
| 7,481,234 B1 | 1/2009 | Gustafson et al. | |
| 2001/0012494 A1 | 8/2001 | Kreichauf | |
| 2001/0053667 A1 | 12/2001 | Kreichauf | |
| 2002/0124490 A1 | 9/2002 | McCarthy | |
| 2002/0134246 A1 | 9/2002 | Babicki et al. | |
| 2002/0170436 A1 | 11/2002 | Keefer et al. | |
| 2003/0011948 A1 | 1/2003 | Saito et al. | |
| 2003/0205131 A1 | 11/2003 | Golden et al. | |
| 2005/0145224 A1 | 7/2005 | Zulauf et al. | |
| 2005/0160912 A1 | 7/2005 | Hrycak et al. | |
| 2005/0160913 A1 | 7/2005 | Hrycak et al. | |
| 2006/0042467 A1 | 3/2006 | Maru | |
| 2006/0048648 A1 | 3/2006 | Gibbs et al. | |
| 2006/0096458 A1 | 5/2006 | Abdolhosseini et al. | |
| 2006/0150811 A1 | 7/2006 | Callahan et al. | |
| 2006/0162704 A1 | 7/2006 | Hagler et al. | |
| 2006/0169142 A1 | 8/2006 | Rode et al. | |
| 2007/0200420 A1 | 8/2007 | McCormick | |
| 2007/0253872 A1 | 11/2007 | Keefer et al. | |
| 2008/0148936 A1 | 6/2008 | Baksh | |
| 2008/0282887 A1 | 11/2008 | Chance et al. | |
| 2009/0293720 A1 | 12/2009 | Liu | |
| 2009/0301493 A1 | 12/2009 | McKenna et al. | |
| 2012/0090470 A1 | 4/2012 | McKenna et al. | |

FOREIGN PATENT DOCUMENTS

| | | |
|---|---|---|
| WO | WO2005086613 | 9/2005 |
| WO | WO2006025853 | 3/2006 |
| WO | WO2007117266 | 10/2007 |
| WO | WO2009152264 | 12/2009 |
| WO | WO2011094296 | 8/2011 |
| WO | WO2012051524 | 4/2012 |

OTHER PUBLICATIONS

Daley, Tom "A New Approach to Non-Regenerative CO2 Removal", Submarine Air Monitoring and Air Purification Conference (SAMAP), San Diego, CA (Oct. 21, 2009), 25 pgs.

Davis, et al, "The Dependence of the CO2 Removal Efficiency of LiOH on Humidity and Mesh Size", presented by The American Society of Mechanical Engineers, at The Intersociety Conference on Environmental Systems, San Diego, California, Jul. 10-13, 1978, 7 pgs.

Davis, et al, "The Factors Influencing the Formation of Li2o3 from LiOH and CO2", presented by The American Society of Mechanical Engineers, at the Intersociety Environmental Systems Conference, San Diego, California, Jul. 14-17, 1980, 6 pgs.

General Specification NASA-JSC, Requirements for Lithium Hydroxide Used for CO2 Removal in Closed Environments, National Aeronautics and Space Administration, Houston, Texas, Oct. 1994, 30 pgs.

"Lithium Hydroxide, Anhydrous", pamphlet CAS No. 1310-65-2, FMC Corporation, copyright 2001, 2 pgs.

Military Specification for Lithium Hydroxide (LiOH), Technical, MIL-L-20213E, Naval Sea Systems Command, Jun. 18, 1980, 12 pgs.

The American Heritage Dictionary of the English Language: Fourth Edition 2000, 2 pgs.

Wang, "Residence Time and Carbon Dioxide Scrubbing Efficiency in Life Support Systems", Aviation Space and Environmental Medicine, Feb. 1981, pp. 104-108.

Webster's Third New International Dictionary, unabridged, 1993, downloaded from the Internet on Nov. 19, 2009, http://lionreference.chadwyck.com/searchFulltext.do?id=31052187&idType=offset&divLevel=2 . . . , 1 pg.

Examiner's First Report dated Oct. 10, 2007 for Australian Appln. No. 2005280633, 2 pgs.

International Preliminary Report on Patentability and Written Opinion dated Jul. 31, 2006 for International Appln. No. PCT/US2005/003480, 8 pgs.

International Preliminary Report on Patentability and Written Opinion dated Jul. 8, 2008 for International Appln. No. PCT/US2006/031847, 6 pgs.

International Preliminary Report on Patentability and Written Opinion dated Dec. 13, 2010 for International Appln. No. PCT/US2009/046939, 9 pgs.

International Search Report dated Feb. 1, 2006 for International Appln. No. PCT/US2005/003480, 3 pgs.

International Search Report dated Apr. 30, 2008 for International Appln. No. PCT/US2006/031847, 3 pgs.

International Search Report dated Aug. 12, 2009 for International Appln. No. PCT/US2009/046939, 1 pg.

International Search Report and Written Opinion dated Mar. 29, 2011 for International Appln. No. PCT/US11/22556, 7 pgs.

International Search Report and Written Opinion dated Feb. 16, 2012 for International Appln. No. PCT/US2011/056345, 12 pgs.

Extended European Search Report in EP Application No. EP 11737564.2, dated Jul. 16, 2013, 6 pages.

Supplementary European Search Report in EP Application No. EP 11737564.2, dated Aug. 2, 2013, 7 pages.

* cited by examiner

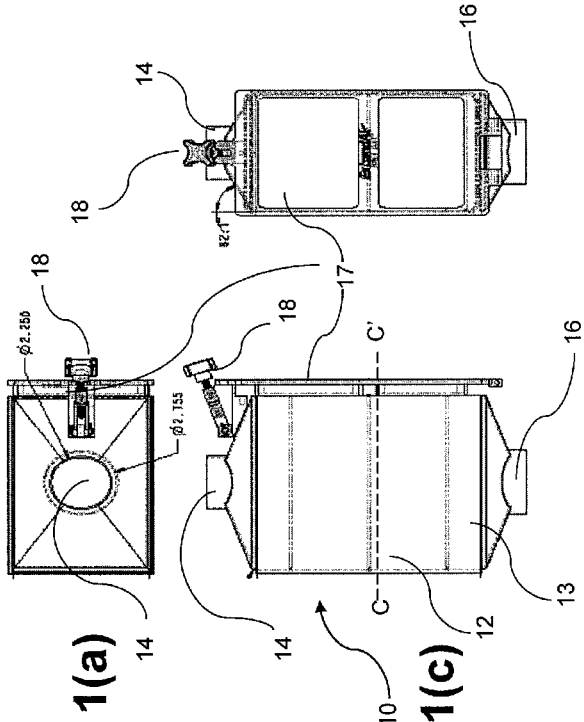

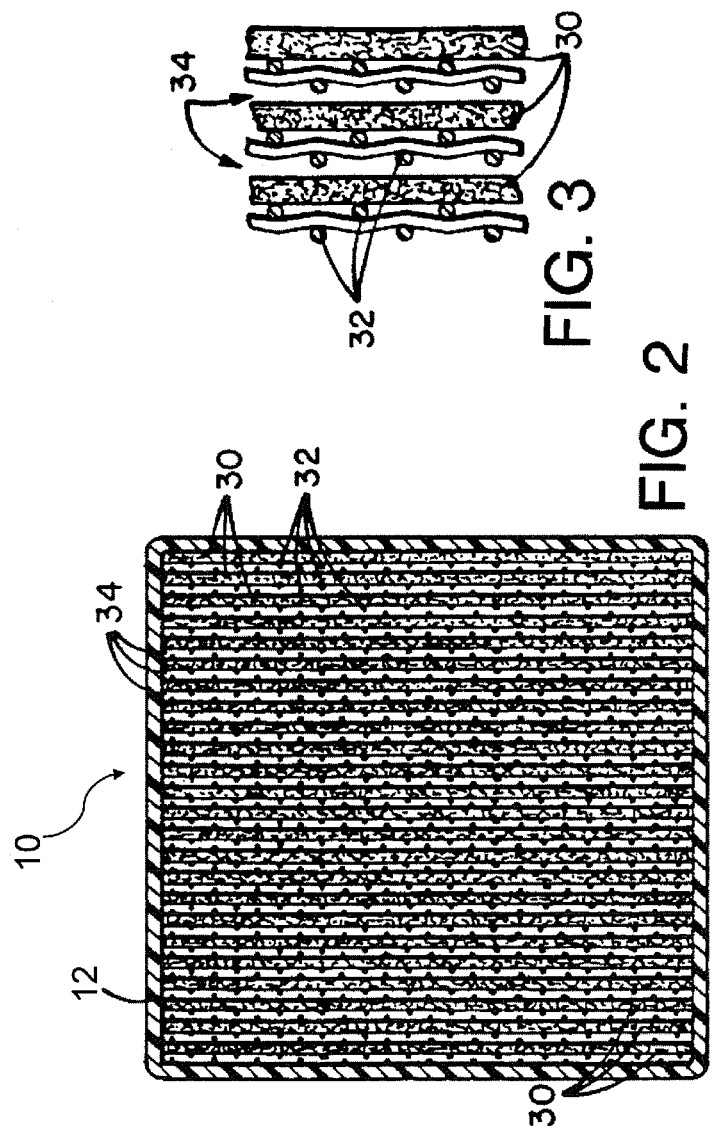

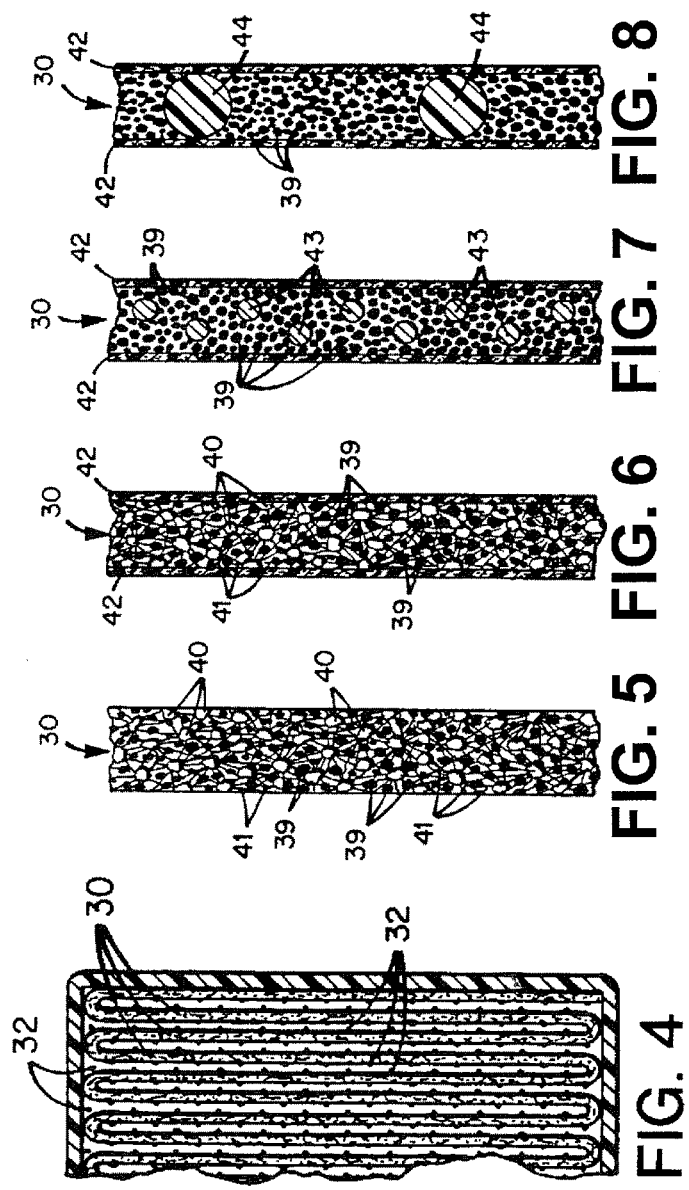

ADSORBENT SYSTEM FOR REMOVAL OF GASEOUS CONTAMINANTS

This application claims the benefit of priority of U.S. Provisional Appl. No. 61/298,426, filed Jan. 26, 2010, which is incorporated herein by reference in its entirety.

TECHNICAL FIELD

This invention relates to an adsorbent system, an adsorbent cartridge, and canister, for removing gaseous contaminants from the air or other gases.

BACKGROUND

A carbon dioxide removal system maintains carbon dioxide ($CO_2$) concentration at a safe level. Maintaining $CO_2$ at safe levels can be accomplished by passing exhaled gases through a chemical adsorbent, such as soda lime or anhydrous lithium hydroxide (LiOH). The cartridge is composed of fine adsorbent powder formed into a microporous sheet by thermally induced phase separation of polyethylene. The process to produce sheets of microporous lithium hydroxide/calcium hydroxide is defined in U.S. Pat. No. 5,964,221. This technology of forming fine powders into pliable sheets replaced the older technology of forming adsorbent powders into granular adsorbents. Both microporous lithium hydroxide and calcium hydroxide adsorbents can be produced under the original patent. The wound cartridge product corrects may of the problems associated with granular adsorbents, such as dusting, settling, flow channeling and high pressure drop.

The microporous technology has been deployed in rebreather systems, mine shelters, and unpowered emergency carbon dioxide control in submarines. Submarines use pre-filled cartridges of granular adsorbents for routine, non-emergency, carbon dioxide control. Pre-packed containers of adsorbent are installed into an electric powered canister system for scrubbing $CO_2$. These pre-packed granules rely on a relatively large container (or exoskeleton) to hold the granules. The plastic exoskeleton containers add material cost to the adsorbent manufacture. They also may pose safety hazards by increasing the amount of available fuel in the event of a fire. Plastic containers also have an environmental impact associated with their disposal. As an alternative, reusable, pre-packed metal containers are easy to handle, safe in a fire and do not contribute to landfills; however in submarine applications for example, they are more expensive initially, and there is a larger logistics cost for handling and off-hull refilling of spent cartridges of adsorbent. The system of stacking adsorbent sheets into a rectangular pack (as described in U.S. Pat. No. 5,964,221) is both costly and inefficient. The bulky external frame required to support the sheets occupies volume and adds manufacturing cost. In applications such as space craft and submarines volume is a primary design driver.

An alternative to adsorbent cartridges with rigid frames is the ExtendAir® adsorbent cartridge manufactured by Micropore Inc. For many applications, an adsorbent sheet is wound on a cylindrical core. The adsorbent is prevented from unwinding, using an inexpensive polymer film wrapped around the outside of the cartridge. This wound cartridge does not require an expensive, and bulky external housing (exoskeleton) to maintain its shape. The parallel adsorbent surfaces are held in contact with each other by the tension applied during the winding process and maintained by the outer polymer film wrap. This cartridge has the ease of handling advantages but the cylindrical geometry is inefficient for storage volume and scrubber installation.

This invention addresses these needs and others.

SUMMARY

Cylindrical cartridges such as a round Extend Air® cartridge do not efficiently utilize storage space. Rectangular adsorbent is the most efficient shape for storage. Until now adsorbent stacked into a rectangle required a bulky external frame, exoskeleton, to support the sheets and provide uniform air flow passages (U.S. Pat. No. 5,964,221). The standard external frame or exoskeleton required to hold these sheets together, reduces volumetric efficiency (the volume occupied by an external frame is volume not available for the adsorbent chemical), and also costs additional money to fabricate and assemble This invention allows for the construction of stacked sheets of adsorbent with minimal internal support and no external support. This application details a revolutionary technique, where a stack of adsorbent sheets can be held together internally, hereby defined as an endoskeleton (by use of fasteners for example), which solves the problems associated with external containment of the adsorbent material. The material cost for this cartridge is reduced because the endoskeleton can be fabricated from inexpensive materials such as metal or plastic bars or staples. Unlike the wound cylindrical ExtendAir® cartridge, the endoskeleton cartridge can be assembled from stacks of sheets and formed into various shapes (e.g., cylinders (from oval or circular sheets), cubes, etc.). The cartridge of stacked sheets may be held together with sufficient endoskeleton structure (multiple stakes) to be self-supporting. Gluing or fusing multiple sheets together using a variety of techniques will also form a stable stack of adsorbent sheets, but has the disadvantage of added manufacturing complexity. In both the multiple stake and glued stacks, the sheets of adsorbent remain in contact with each other without external support. In this self-supporting configuration, the endoskeleton cartridge may be installed into a canister wherein the canister is not required to provide any structural support to the cartridge.

The endoskeleton adsorbent may also be loosely held together (very few stakes is one way to achieve this). The sheets are held in place to permit packaging and handling of the consumable cartridge, however, the sheets are not held together with sufficient force to maintain uniform gas flow between the sheets during use. Instead, this cartridge, with a limited endoskeleton, is installed into a specially designed canister, wherein the scrubber canister provides the additional support needed to maintain the optimal sheet spacing and adsorbent performance. In this embodiment, where the adsorbent sheets are loosely held by an endoskeleton, the canister provides the force to maintain contact between sheets (with internal spacing). The proper contacting of the sheets maintains the air passages required for consistent and efficient adsorption. This loosely held cartridge with a minimal endoskeleton offers the lowest cost of manufacture, while still allowing for optimal utilization in the scrubber canister.

Accordingly, the present invention provides, inter alia, an adsorbent cartridge for removal of gaseous contaminants comprising:

a plurality of parallel, non-wound adsorbent surfaces, mechanically spaced so as to allow gas flow between each surface in the plurality; and one or more fasteners, wherein the one or more fasteners secures the plurality of said surfaces together. In some embodiments, the cartridge does not further comprise a rigid shell encasing the cartridge. In some embodiments, the non-wound adsorbent surfaces are planar.

In some embodiments, the one or more fasteners are disposed within the adsorbent cartridge. In some embodiments, the one or more fasteners comprise one or more fasteners independently selected from stakes, staples, wires, rods, cords, plastic bands, elastic bands, and rivets. In some embodiments, the one or more fasteners comprise one or more rigid stakes. In some embodiments, the fasteners comprise rigid or elastic bands disposed around the outside of the cartridge, not blocking the direction of gas flow through the cartridge layers.

In some embodiments, the one or more fasteners comprise a plurality of rigid stakes arranged within the adsorbent cartridge to fasten the adsorbent surfaces such that no additional external mechanical support is required during use when the adsorbent cartridge is subjected to a gas flow. In some embodiments, the one or more fasteners comprise at least one rigid stake arranged to provide structural support to the cartridge. In some embodiments, the rigid stakes are arranged perpendicular to the gas flow. In some embodiments, the rigid stakes are arranged at an angle to the gas flow.

In some embodiments, the adsorbent surfaces are spaced by ribs disposed on the adsorbent surfaces. In some embodiments, the adsorbent surfaces are spaced by separating screens between the adsorbent surfaces.

In some embodiments, the cartridge further comprises a polymer foam that seals the outer surface of the cartridge, but does not block the inlet and outlet passages. In some embodiments, the cartridge further comprises a polymer sleeve surrounding the outer surface of the cartridge, but does not block the inlet and outlet passages.

In some embodiments, the cartridge comprises square adsorbent sheets arranged into a cube. In some embodiments, the cartridge comprises round or oval adsorbent sheets arranged into a cylinder. In some embodiments, the cartridge comprises triangular or trapezoidal sheets arranged into a solid block of adsorbent. In some embodiments, the cartridge comprises rectangular adsorbent sheets arranged into a rectangular stack.

In some embodiments, the drop of pressure between a flow of gas into and out of the cartridge is less than 200 Pascals for a flow rate of gas between 50 to 400 standard liters per minute (slpm).

In some embodiments, the gaseous contaminant includes, but is not limited to, carbon dioxide ($CO_2$). In some embodiments, gaseous contaminant includes, but is not limited to, carbon monoxide, chemical or biological toxins, volatile organic carbons, moisture, acid gases or other impurities in the feed gas stream. In some embodiments, the gaseous contaminant includes, but is not limited to, carbon dioxide ($CO_2$), carbon monoxide, chemical or biological toxins, volatile organic hydrocarbons, or moisture.

In some embodiments, the adsorbent includes, but is not limited to, calcium hydroxide ($Ca(OH)_2$) and/or lithium hydroxide (LiOH). In some embodiments, the adsorbent includes, but is not limited to, molecular sieve, activated carbon, oxidation catalyst.

The present invention further provides a canister for use with an adsorbent cartridge to remove gaseous contaminants comprising:

an inlet through which gas can flow to contact the adsorbent cartridge;

an outlet for gas flow; and a plurality of support structures disposed on the interior walls of the canister, which provide mechanical stability to the adsorbent cartridge by restricting movement of the cartridge within the canister during use.

In some embodiments, the plurality of support structures allows the exertion of mechanical pressure on the outer surface of the cartridge not directly exposed to gas flow (e.g., along the sides that are not in the inlet or outlet flow stream).

In some embodiments, the plurality of support structures comprises a plurality independently selected from springs, bars, and plates.

In some embodiments, the plurality of support structures comprises rigid rods arranged perpendicular to the gas flow.

In some embodiments, the plurality of support structures comprises elastic springs which allow exertion of a variable amount of mechanical force to the sides of the adsorbent cartridge. In some embodiments, the canister further comprises rails disposed on up to four walls of the canister to prevent or reduce gas from flowing around the cartridge.

In some embodiments, the canister further comprises a diffusion panel, which allows uniform gas flow across a cross-sectional surface of the adsorbent cartridge.

In certain embodiments, the canister is used together with the adsorbent cartridge.

In some embodiments, the cartridge comprises:

a plurality of parallel, non-wound adsorbent surfaces, mechanically spaced by ribs along the absorbent surfaces so as to allow gas flow between each surface in the plurality; and one or more rigid stakes disposed within the cartridge to secure the plurality of said surfaces together; wherein the stakes enter the plurality of absorbent surfaces from the top or bottom sheet;

wherein said cartridge does not further comprise a rigid shell encasing the cartridge.

The present invention also provides a gaseous contaminant removal system comprising:

(1) an adsorbent cartridge comprising:

a plurality of parallel, non-wound adsorbent surfaces, mechanically spaced so as to allow gas flow between each surface in the plurality; and one or more fasteners, wherein the one or more fasteners secures the plurality of said surfaces together; wherein the cartridge does not further comprise a rigid shell encasing the cartridge; and (2) a canister comprising:

an inlet through which gas can flow to contact the adsorbent cartridge;

an outlet for gas flow; and a plurality of support structures disposed on the interior walls of the canister, which provide mechanical stability to the adsorbent cartridge by restricting movement of the cartridge within the canister during use;

wherein the cartridge is placed in the canister such that the gas flow from the inlet of the canister can flow between the adsorbent surfaces in said cartridge.

In some embodiments, the plurality of support structures allows the exertion of mechanical pressure on the outer surface of the cartridge not directly exposed to gas flow.

In some embodiments, the gaseous contaminant removal system contaminant eliminates a contaminant which includes, but is not limited to, carbon dioxide ($CO_2$), carbon monoxide, chemical or biological toxins, volatile organic hydrocarbons, or moisture.

In some embodiments, the gaseous contaminant removal system includes a cartridge described in one of the above embodiments. In some embodiments, the gaseous contaminant removal system includes a canister described in one of the above embodiments.

In some embodiments, the gaseous contaminant removal system includes a cartridge featuring a plurality of adsorbent surfaces.

The present invention further provides a method of using the adsorbent cartridge as a backup emergency gaseous contaminant removal system in an enclosed space by directly inserting the cartridge into a chute in a scrubbing or ventilation system.

In some embodiments, an adsorbent cartridge for removal of gaseous contaminants includes a plurality of parallel, non-wound adsorbent surfaces, mechanically spaced so as to allow gas flow between each surface in the plurality; and adhesives that are used to secure the plurality of said surfaces together; wherein the cartridge does not further comprise a rigid shell encasing the cartridge.

The details of one or more embodiments of the invention are set forth in the accompanying drawings and the description below. Other features, objects, and advantages of the invention will be apparent from the description and drawings, and from the claims.

It is appreciated that certain features of the invention, which are, for clarity, described in the context of separate embodiments, can also be provided in combination in a single embodiment.

DESCRIPTION OF DRAWINGS

FIGS. 1(a)-(e) show different views of a canister of the present invention.

FIG. 2 is a cross-section view of parallel aligned sheets taken along line C-C' of FIG. 1(c).

FIG. 3 is an enlargement of a portion of the cross-section shown in FIG. 2.

FIG. 4 is a cross-section view of a canister of the present invention having a pleated sheet.

FIG. 5 is a cross-section view of an adsorption sheet of the present invention where the sheet is formed of expanded polytetrafluoroethylene with adsorbent particles encapsulated within.

FIG. 6 is a cross-section view of an adsorption sheet of the present invention where the sheet of FIG. 5 is surrounded by an outer membrane.

FIG. 7 is a cross-section view of an adsorption sheet of the present invention where adsorbent material is attached to an internal screen and outer membranes are attached to the adsorbent particles.

FIG. 8 is a cross-section view of an adsorption sheet of the present invention where outer membranes are attached to an internal screen and the interstices in the screen contain adsorbent material.

Figure 1E:
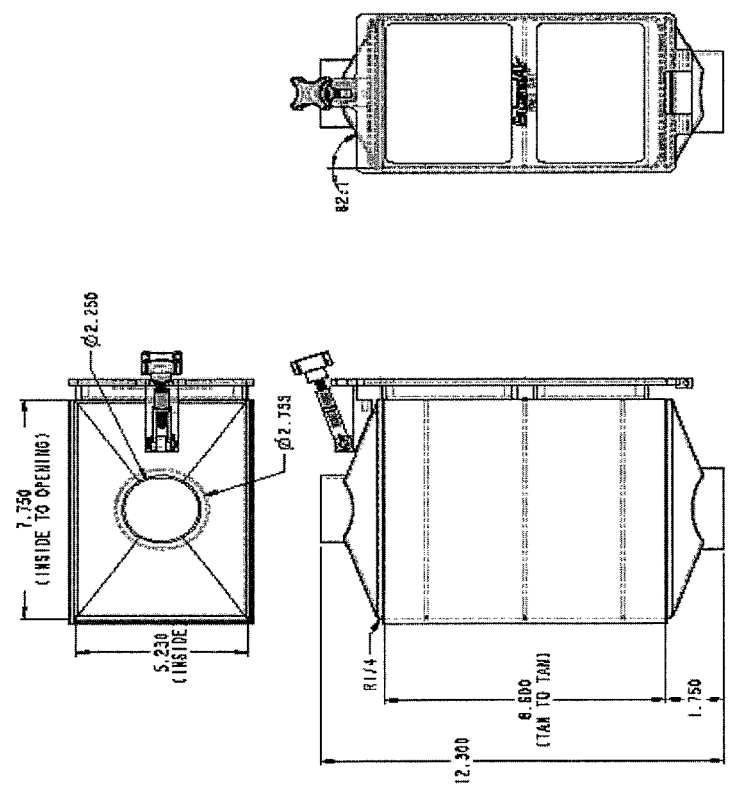

Certain of the drawings illustrate the invention of a loosely held stack of sheets installed in a canister that provides support to these loosely held sheets. Drawings are also included to illustrate a self-supporting stack of sheets held together with an inexpensive endoskeleton. Like reference symbols in the various drawings indicate like elements.

DETAILED DESCRIPTION

Existing rectangular adsorbent cartridges use rigid external frames to hold the adsorbent together. These rigid frames add cost and occupy valuable volume. The volume occupied by an external frame is not available to hold adsorbent. This unique invention eliminates the requirement for an external frame. This invention provides a means of inexpensively and volumetrically efficiently assembling a stack of adsorbent sheets into a cartridge. In one embodiment the sheets are loosely secured and are placed into a canister for operation. In a second embodiment the sheets are firmly secured with an endoskeleton and operated in a canister or placed directly in an airstream. The present invention provides a gas adsorbent system that is designed to provide efficient adsorption, uniform depletion of adsorbent material, and a minimum pressure drop for gases passing through. A method of mechanically securing chemically reactive adsorbent sheets to form adsorbent cartridges that achieve optimal performance at low cost to manufacture is also disclosed. As the mechanism for removing gaseous contaminants from a gas is dependent on the particular material chosen, the use of the word "adsorption" in this specification is meant to include adsorption, absorption, chemisorption, physisorption, catalysis, etc.

The disclosed apparatus and the method of securing chemical reactive adsorbent sheets are well suited for operations where power is available for generating an air stream, including, but not limited to, enclosed spaces. Existing markets that can benefit from the disclosed apparatus and method include, but are not limited to, diesel-electric powered submarines, nuclear submarines, safety shelters (CBRN—chemical, biological, radiological, and nuclear), hyperbaric chambers, powered mine shelters, industrial gas separation and purification processes, and other industrial gas adsorbent systems. The disclosed apparatus and the method of securing chemical reactive adsorbent sheets are also advantageous in rebreather systems such as SCUBA rebreathers, personnel protection systems and firefighter rebreathers.

Accordingly, disclosed herein, inter alia, is a gaseous contaminant removal system, comprising:

(1) an adsorbent cartridge comprising:

a plurality of parallel, non-wound adsorbent surfaces, mechanically spaced so as to allow gas flow between each surface in the plurality; and one or more fasteners, wherein the one or more fasteners secures the plurality of said surfaces together without a rigid shell encasing the cartridge; and (2) a canister comprising:

an inlet through which gas can flow to contact the adsorbent cartridge;

an outlet for gas flow; and a plurality of support structures disposed on the interior walls of the canister, which provide mechanical stability to the adsorbent cartridge by restricting movement of the cartridge within the canister during use wherein the cartridge is placed in the canister such that the gas flow from the inlet of the canister can flow between the adsorbent surfaces in said cartridge.

The system described utilizes a cartridge with adsorbent surfaces for adsorbing gaseous contaminants, as well as a canister which, in some embodiments, can provide support for the cartridge. The cartridge and canister are described in more detail below.

1. Adsorbent Cartridge

The present invention further provides an adsorbent cartridge for removal of gaseous contaminants comprising:

a plurality of parallel, non-wound adsorbent surfaces, mechanically spaced so as to allow gas flow between each surface in the plurality; and one or more fasteners, wherein the one or more fasteners secures the plurality of said surfaces together.

In some embodiments, the cartridge does not further comprise a rigid shell encasing the outer surfaces of the cartridge (exoskeleton). The term "non-wound" means that the plurality of surfaces are not wound into a roll.

Figure 24:
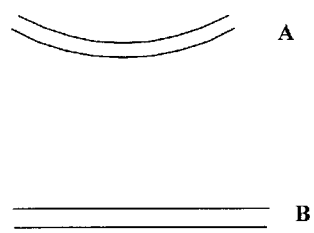
FIG. 24 depicts two non-limiting embodiments of "parallel" surfaces (A shows two curved parallel surfaces, while B shows two "planar" parallel surfaces). The spacers (e.g., mechanical spacers or ribs on the surface) are not shown.

Generally, the adsorbent sheets are positioned parallel to each other. The term "parallel" as used to describe parallel surfaces means that each surface is substantially equidistant from the adjacent surface. The term is not meant to limit the embodiments to surfaces having common perpendiculars across the whole surface, although these embodiments are included within the phrase "parallel surfaces". FIG. 24 depicts two non-limiting possible arrangements of surfaces within the meaning of "parallel" surfaces. FIG. 24A shows two curved parallel surfaces, while FIG. 24B shows two planar parallel surfaces.

In some embodiments, the non-wound adsorbent surfaces are planar. The term "planar" used to describe surfaces means that the adsorbent surfaces are substantially without curvature (e.g., the surfaces are not rolled). These planar adsorbent surfaces may be flat, or pleated, or contain ribs therein. In some embodiments, the sheets are stacked into a cube (90 degree corners on all sides but length, width and depth may or may not be identical). The sheets may also be stacked into cylinders or other geometries. A fixture may be used to square up the cube. The cubic shape of the adsorbent cartridges is optimized for storage volume efficiency. The packaged sheet adsorbent provides approximately 33% more adsorbent mass than granular product of similar dimensions.

Generally, the surfaces are mechanically spaced (e.g., by ribs or other spacers, screens, etc.) where the spacers are in contact with the next adjacent sheet. In some embodiments, the spacers are parallel to the direction of air flow.

In some embodiments, each adsorbent surface comprises the same type of adsorbent. In other embodiments, each adsorbent surface is independently selected from various adsorbents.

Figure 25:
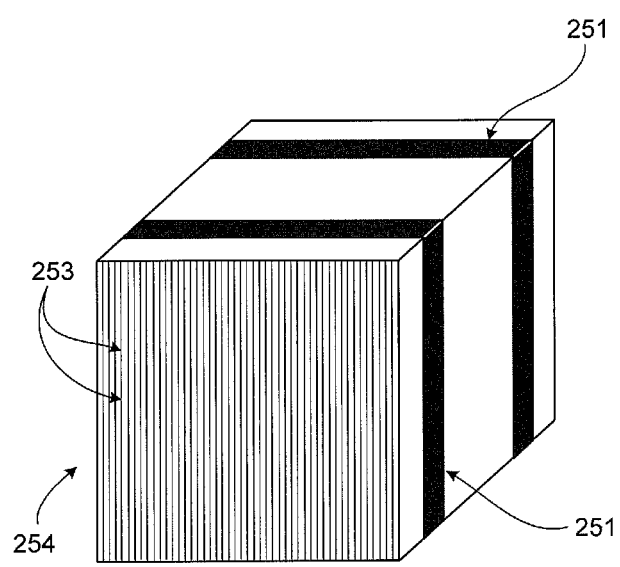
FIG. 25 depicts one non-limiting embodiment of a cartridge wherein the fasteners are plastic or elastic bands securing the surfaces into a shape.

The parallel, planar adsorbent surfaces are then mechanically secured using one or more fasteners. The adsorbent cartridges can be mechanically secured under two broad categories: The fasteners may be rigid stakes disposed within the cartridge. In some embodiments, the rigid stakes are driven into the surfaces layers in a direction perpendicular to the top and/or bottom absorbent sheet. In some embodiments, the fasteners comprise one or more elastic or rigid plastic bands wrapped around the outside of the cartridge, but not blocking the direction of gas flows (see FIG. 25).

Self-Supported Adsorbent Cartridge

Figure 15:
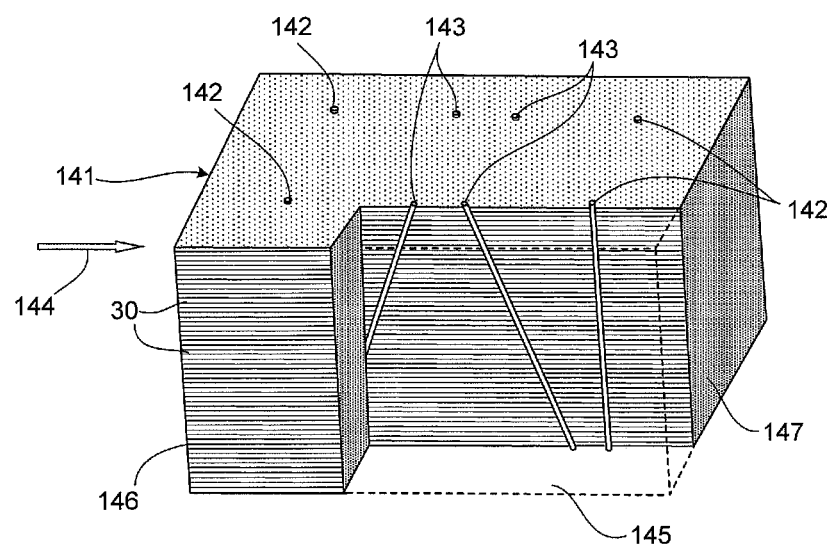
FIG. 15 is a self-supported adsorbent cartridge in which part of the adsorbent volume has been removed (for illustration purposes) to expose the stakes securely fastening the adsorbent sheets.

FIG. 15 shows an embodiment of a self-supported adsorbent cartridge 141 containing adsorbent sheets 30 in which multiple stakes 142 and 143 (8 in the embodiment depicted in FIG. 15) are driven into the adsorbent cartridge to securely hold the chemically reactive adsorbent sheets together. A volume 145 demarcated by dashed lines is removed from adsorbent cartridge 141 in FIG. 15 to expose stakes 142 and 143. These stakes enable the cartridge to maintain its correct external dimensions while simultaneously holding each sheet against the adjacent sheets. Alternatively, the adsorbent sheets can be staked with a staple or staples, a wire, rod(s), a cord, rivet(s), or elastic materials. The rigid staked cartridge may be further wrapped with a thin polymer sleeve such that the sleeve does not cover air inlet and outlet faces 146, 147 of the adsorbent cartridge. This thin sleeve prevents the end user from contacting the adsorbent chemical. The sleeve provides little or no clamping forces to hold the adsorbent cartridge together.

In some embodiments no polymer sheet is wrapped around the cartridge. The stakes rigidly hold the sheets in place such that sheet to sheet contact is maintained. As shown in FIG. 15, stakes 142 are inserted perpendicular to flow path 144 and additional cartridge stability can be achieved by inserting a stake or multiple stakes 143 at angles up to at 90 degrees with respect to flow path 144, which reduce or eliminate flexing of the cartridge. Air inlet face 146 and air outlet face 147 of cartridge 141 can be reversed should the direction of flow 144 be reversed. Cartridge 141 functions similarly for airflow from both directions.

Cartridge 141 can further include a wrap of polymer foam on four sides of the cartridge to allow for sealing when cartridge 141 is installed into a canister. The polymer foam could be installed by itself or over or under a polymer wrap.

In another embodiment, a heavy shrink wrap (in the range of 0.020 to 0.063 inches thick, as compared to a thin wrap of a few thousands of an inch) around the staked cartridge effects a larger degree of clamping force. The combination of the stakes and outer wrap enables the self-supported cartridge to maintain sheet to sheet contact without the need for any additional external structural support.

Loosely Secured Staked Adsorbent Cartridge

In some embodiments, the surfaces of the cartridge may be only loosely secured together. In this case, the canister provides mechanical stability to the cartridge during use.

Accordingly, in some embodiments, a few (e.g., 2 or 3) stakes are driven into the adsorbent cartridge to provide structural integrity for handling and packaging. Alternatively, the adsorbent sheets can be staked with a staple or staples, a wire, rod(s), a cord, rivet(s), or elastic materials. The loosely secured staked cartridge may be wrapped in a thin polymer sleeve such that the sleeve does not cover the air inlet and outlet faces of the cartridge. This outer sleeve prevents the end user from contacting the adsorbent chemical when loading the cartridge into the canister. The outer sleeve provides minimal clamping forces to hold the cartridge together. The stakes provide sufficient structural support to keep the cartridge intact for installation into the canister. In some embodiments, the stakes are placed near the center of the cartridge surface.

Alternatively, in some embodiments, the cartridge is not wrapped with a polymer sheet. The sheets are loosely held by stakes inserted into the sheets.

In some embodiments, the cartridges can include a wrap of polymer foam on four sides of the cartridge to allow for sealing when the cartridge is installed into a canister. The foam may be installed by itself or over/under a polymer wrap. Stakes installed in the direction parallel to the flow stream may also be used to join 2 or more cartridges together. Stakes can also have multiple possible cross sections. Once the stakes are installed, the cartridge can then be removed from the forms or tooling and be subjected to further handling. Cartridges may be placed in appropriate barriers/containers for their intended shelf lives to protect the cartridges from water vapor loss or gain, and $CO_2$ ingress from the air.

In some embodiments, the adsorbent cartridges may be installed into a specialized canister that maintains the proper geometry of the adsorbent. In some embodiments, high shock mountings or shock isolators can be incorporated into the canister for operation in hostile environments.

In some embodiments, the cartridges are deployed in the system described herein by placement into a canister. Particular embodiments describing the deployment of the self-supported and loosely secured cartridge are detailed below.

2. The Manufacture of Adsorbent Surfaces

In some embodiments, the gaseous contaminant includes, but is not limited to, carbon dioxide. In some embodiments, the adsorbent material used in the adsorbent surfaces includes, but is not limited to, calcium hydroxide or lithium hydroxide.

Activated carbon can be incorporated into adsorbent surfaces to remove volatile organic compounds (VOCs), chemical or biological toxicants and other contaminants. Similarly, the use of lithium hydroxide and calcium hydroxide is not limited only to the removal of $CO_2$, they can also remove other acidic gases such as sulfur dioxide, hydrogen sulfide and chlorine compounds. Furthermore, the use of desiccants such as molecular sieves in cartridges enables the removal of moisture. Other types of molecular sieves are able to remove $CO_2$ and other contaminant gases.

Besides the removal of gaseous contaminants, catalysts such as hopcalite, manganese oxide, copper oxide and precious metals can be used to accelerate oxidation reactions of gaseous contaminants. For example, carbon monoxide can be oxidized into carbon dioxide which can then be removed using an adsorbent cartridge containing, for example, LiOH or $Ca(OH)_2$.

In some embodiments, the gaseous contaminant includes, but is not limited to, carbon dioxide ($CO_2$), carbon monoxide (CO), volatile organic compounds (VOCs), chemical or biological toxicants, sulfur dioxide, hydrogen sulfide, chlorinated compounds or water vapor.

Further description of LiOH adsorbent sheets can be found in, for example, Hrycak et al. in U.S. Pat. No. 7,329,307 and U.S. Pat. No. 7,326,280, each of which is incorporated herein by reference in its entirety. Further description of $Ca(OH)_2$ adsorbent sheets and other types of adsorbent sheets can be found in, for example, in McKenna, U.S. Pat. No. 5,964,221, which is incorporated herein by reference in its entirety.

As illustrated in FIGS. 2 and 3, in some embodiments, the inside hollow portion of canister 10 contains porous, liquid-water resistant, air permeable sheets 30 that contain an adsorbent material, which form the adsorbent cartridge. Sheets 30 are aligned parallel to the direction of gas flow and run substantially the length of the canister body. Gases from which contaminants (e.g. $CO_2$) are to be removed pass through inlet 14 of canister 10 in FIG. 1(a), through space 34 between sheets 30, and out through outlet 16. As gases flow past these adsorbent sheets, certain gases will diffuse into said sheets and react with or be adsorbed by adsorbents contained therein. Since the sheet surfaces are aligned parallel to the gas flow, a controlled and lower pressure drop is maintained, as well as uniform flow past all sheets, allowing for efficient adsorption and a uniform depletion of the adsorbent contained in sheets 30.

As shown in FIG. 2, canister 10 may contain a plurality of porous hydrophobic, gas-permeable adsorbent sheets 30 that are aligned so that the gas flows substantially parallel to surfaces of sheet 30. In this embodiment, canister body 13 of FIG. 1(c) has a rectangular cross-section. Sheets 30 are spaced apart from each other by separating screens 32. FIG. 3 shows a detailed sectional view of adsorbent sheets 30 and separating screens 32 where separating screens 32 are positioned between sheets 30. The separating screen 32 and sheets 30 are held in position parallel to the gas flow through the canister.

FIG. 4 shows another embodiment taken along line C-C' of FIG. 1(c) where a rectangular canister body 13 contains a sheet 30 that is "pleated" and portions of the pleated sheet are spaced apart by separating screens 32. The separating screens 32 need not be attached to the canister body 12 (FIG. 1(c)) or to the sheet 30.

In one embodiment shown in FIG. 5, sheet 30 is formed of an adsorbent filled expanded porous PTFE sheet having a microstructure of nodes 40 interconnected with fibrils 41 wherein adsorbent material 39 is present in the voids of the PTFE structure as taught by U.S. Pat. No. 4,985,296 issued to Mortimer, Jr., incorporated herein by reference in its entirety. This sheet is water repellent, but air-permeable. Ideally, particles 39 are packed in a multi-modal (e.g., bi-modal or tri-modal) manner, with particles of different sizes interspersed around one another to fill as much of the available void space between particles as is possible so as to maximize the amount of active material contained in the sheet. This technique also allows more than one type of adsorbent particle to be filled into a single sheet.

By using filled porous expanded polytetrafluoroethylene (PTFE) as sheet 30, a number of additional advantages are further imparted. Expanded PTFE is a non-linting, non-outgassing inert material that effectively reduces dusting of adsorbent material during manufacturing and during the life of the filter. Additionally, processing advantages of this material include the ability to make a relatively thin material that can be produced in a wide sheet and then cut (or cut and pleated) into desired configurations.

The properties of $CO_2$ adsorbent filled PTFE sheet are such that no other supporting fabric or material is needed to maintain structural integrity. In fact, not only can this filled PTFE sheet withstand flexing, pleating and mechanical vibration under dry conditions, the hydrophobicity of the PTFE offers this structural durability even while subjected to direct liquid water contact, without water ever mixing with the $CO_2$ adsorbent.

Another embodiment of sheet 30 is shown in FIG. 6, where filled PTFE sheet 30 is encapsulated between two hydrophobic gas-permeable membranes 42. These outer membranes 42 add extra protection to ensure that adsorption material 40 is contained within sheet 30 while preventing water from reaching the adsorbent contained in the sheet. Membranes 42 must have a high degree of filtration efficiency to prevent adsorbent particles from escaping into the breathing atmosphere. These membranes 42 preferably comprise porous expanded polytetrafluoroethylene (PTFE), because it is hydrophobic and offers high particulate filtration efficiency.

A third embodiment of the sheet is shown in cut-away FIG. 7 where an internal screen 43 is encapsulated by adsorbent material 39 that is surrounded by two hydrophobic gas-permeable membranes 42.

A fourth embodiment of the sheet 30 is shown in FIG. 8 where an internal screen 44 is attached to two hydrophobic gas-permeable membranes 42 and adsorbent material 39 is positioned in the voids between screen members 44.

Figure 11:
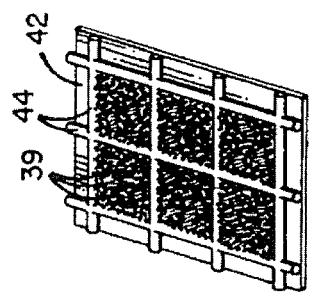
FIGS. 9 through 12 are three-quarter elevation views of a method for forming the sheet of FIG. 8.
Figure 10:
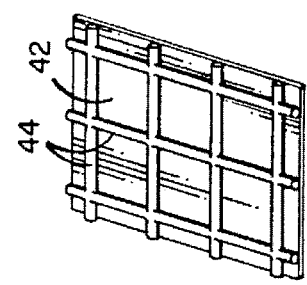
Figure 9:
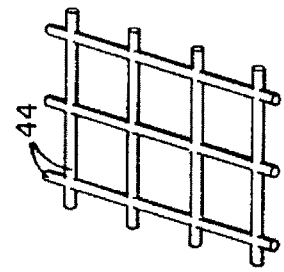
Figure 12:
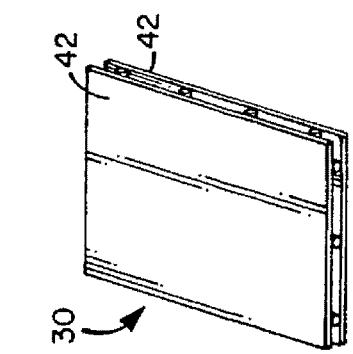

FIGS. 9 thorough 12 illustrate a method for making sheet 30 of FIG. 8 having an internal screen 44, adsorbent material 40, and outer membranes 42. FIG. 9 depicts internal screen 44. Next, in FIG. 10, internal screen 44 is attached to a membrane 42 by a lamination process. Subsequently, in FIG. 11, adsorbent material 39 is added into the open cells of internal screen 44. Afterwards, in FIG. 12, a second membrane 42 is laminated to the top of the internal screen 44, thereby encapsulating adsorbent material 40 within.

Figure 13:
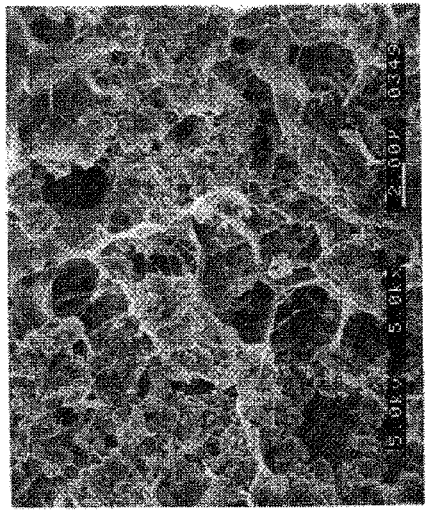
FIG. 13 is a scanning electron micrograph of adsorbent powder in a microporous sheet as defined in U.S. Pat. Nos. 5,964,221 and 7,326,280.

FIG. 13 is a scanning electron micrograph of another embodiment of sheet 30 used in the cartridges described herein. This structure is produced by way of thermally induced phase separation, such as in the following manner.

A water repellent polymer, such as ultra high molecular weight polyethylene, is combined with a gas adsorbent material, such as calcium hydroxide powder. This combination may be accomplished by combining the two materials together in an extruder. By conveying this mixture through the extruder and mixing with a lubricant, such as mineral oil, the polymer dissolves in the lubricant and become uniformly mixed with the adsorbent and lubricant. This mixture can then be extruded into a composite sheet or other shape.

The composite sheet may be calendared to further flatten the sheet if desired. The lubricant may then be extracted out of the resulting sheet using a solvent, such as hexane. The solvent may then be removed, such as through use of a dry nitrogen purge.

The resulting structure is highly micro-porous, allowing for the diffusion of $CO_2$ or other gases, and yet is able to be produced with very high adsorbent powder loadings per unit volume. Additionally, if a very strong polymer, such as Ultra High Molecular Weight Polyethylene is used, a very small amount of polymer is required to make the sheet structurally stable, which allows for even higher adsorbent loadings per unit volume. While typical powder loadings for this type of manufacturing process are on the order of 50 to 60% filler powder after process oil extraction, loadings well above 60% may be possible. In some embodiments, adsorbent loading is greater or equal to about 90% by weight. In some embodiments, adsorbent loading is greater or equal to about 97%. Additionally, in some embodiments, the material is molded into any desired shape, and thus, the separating means may be accomplished by molding separating ribs onto the surface of the sheet.

Figure 14:
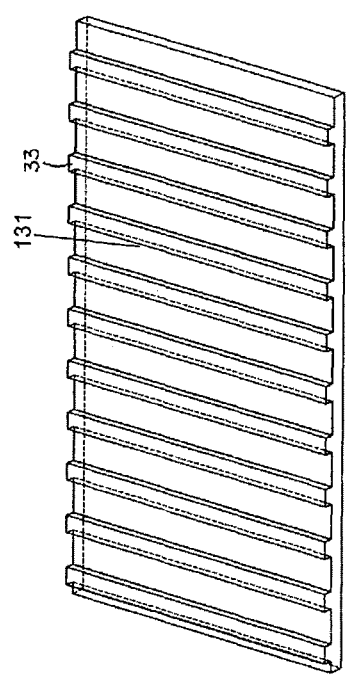
FIG. 14(a) is a three-quarter top elevation view of an adsorbent sheet for use in the present invention, in which separating ribs have been molded on one side of the sheet out of the adsorbent itself.
FIG. 14(b) is a cross-section view of the adsorbent sheet shown in FIG. 14(a).
FIG. 14(c) is a three-quarter top elevation view of another embodiment of an adsorbent sheet for use in the present invention, in which separating ribs have been molded in an angular fashion on one side of the adsorbent sheet.
FIG. 14(d) is a three-quarter side elevation view of still another embodiment of an adsorbent sheet for use in the present invention, in which separating ribs have been molded in an angular fashion on both sides of the adsorbent sheet.
FIG. 14(e) is a detailed view of the adsorbent sheet illustrated in FIG. 14(d).
Figure 14:
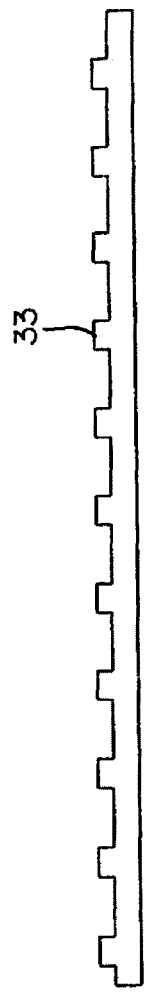
Figure 14:
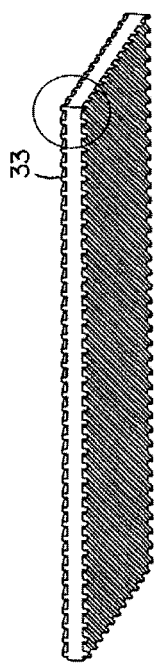
Figure 14:
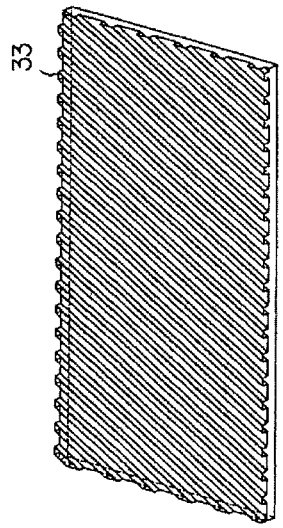
Figure 14:
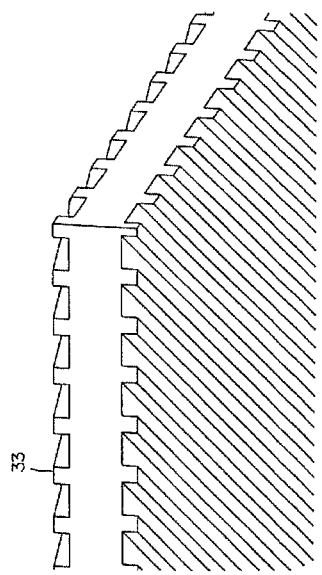

Various embodiments of this molded structure are illustrated in FIGS. 14(*a*) through 14(*e*). By molding the separating elements 33 (or "ribs") directly out of adsorbent material, not only is the adsorbent cartridge easier to produce, but, because of its self-separating properties, the total amount of adsorbent in the filter can be increased by 10 to 30 percent. It is contemplated that any gas adsorbent powder could be integrated for any adsorbent application and take advantage of the invention disclosed herein (e.g., the embodiments of the cartridge and/or system).

3. Canister

The disclosed gas adsorbent system includes a canister that holds the adsorbent cartridge to provide support for the structural integrity of the cartridge during use, thereby minimizing structural integrity requirements of the cartridge. Since a cartridge is replaced when its active adsorbents are consumed, the less stringent structural integrity requirements lead to lower associated manufacturing costs. Further, because the fasteners hold the parallel layers together without need for a rigid outer casing, the removable cartridge provides more adsorbent in the same volume and at a lower cost.

FIGS. 1(*a*)-(*d*) show different views of one embodiment of the gas adsorbent canister device, indicated generally as 10. Canister 10 comprises a wall 12 defining a hollow canister body 13 that has a gas inlet 14 and outlet 16. In addition, canister 10 has a front/loading door 17 with a closing/locking mechanism 18. Canister 10 can be of any shape, but is preferably rectangular. FIG. 1(*a*) shows the view of the canister from the side of gas inlet 14. FIG. 1(*b*) shows a perspective view of canister 10. Canister 10 can be composed of a rigid material, such as stainless steel or glass fiber reinforced plastic.

An alternative seal design uses flexible seals in the canister to prevent or reduce air bypass. In some embodiments, these flexible seals can be soft round polymer O-rings that line the inner perimeter of the canister (with a necessary split for door opening). In other embodiments, these flexible seals can resemble wiper blades. One edge of the wiper blade is fixed to a canister wall while a free edge can be bent upwards or downwards such that the cartridge can form a tight fit upon contact with the seal when inserted into the canister. Flexible seals are very useful for cartridges that expand (for example, LiOH) or contract during operation. These flexible seals can be used alone or in conjunction with side rails such that the force exerted by the canister rails and/or seals hold the adsorbent sheets in the cartridge together.

To conform to existing (in-place) systems, the canister could be redesigned to change the pressure drop. The addition of orifice plates at the inlet, at the outlet or at the inlet and outlet will increase system pressure drop and match the installed fan performance. Sintered metal sheets or stacks of fine screens may be used to increase pressure drop in place of orifice plates.

Figure 18:
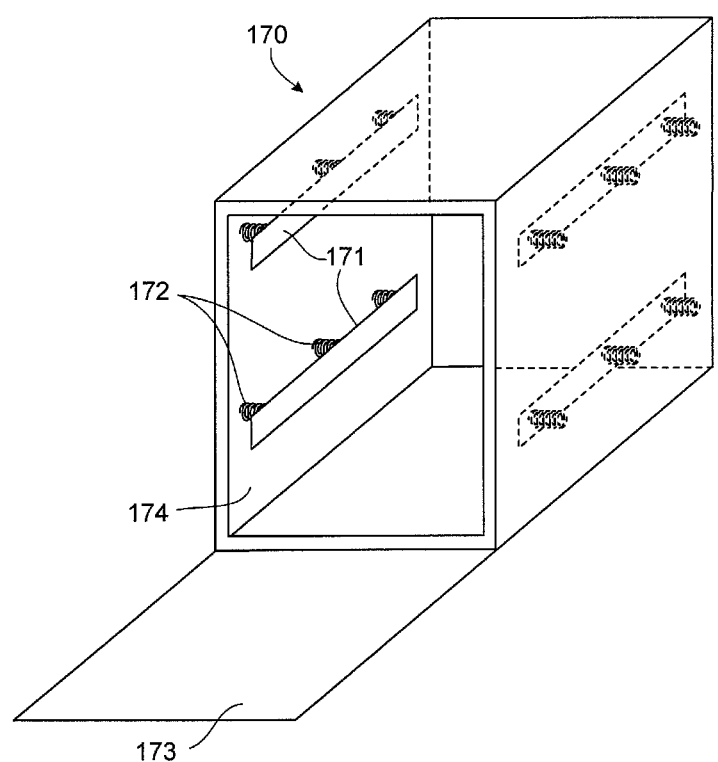
FIG. 18 shows another embodiment of the canister with flexible mechanical supports.

In another embodiment shown in FIG. 18, canister 170 includes elastic mechanisms for securing an adsorbent cartridge. Only components relevant to the elastic mechanisms are illustrated in FIG. 18, hence the figure does not show, for example, an inlet or outlet ports for gases. Canister 170 can employ spring-loaded rails (171) to clamp the adsorbent, as depicted in the schematic shown in FIG. 18. One end of springs 172 is attached to a side wall 174 of canister 170, and the other end to rails 171. In some embodiments, the cartridge can be redesigned to expand into the canister supports. LiOH cartridges can expand in volume by up to 10% during use. Canisters with elastic mechanisms are thus ideal for providing variable amounts of mechanical force to secure the expandable cartridge and to maintain its optimal alignment with the gas flow during use.

Instead of the symmetric gas flow design described for the embodiments above, in some embodiments, the canister can be designed to allow flow in only one direction.

Multiple cartridges can be installed into another embodiment of the canister for concurrent removal of different gases. The multiple cartridges in the canister can be arranged to have either parallel or serial flow. For parallel flow, 2 separate cartridges may be installed side by side to control different contaminants. One example is a small cartridge to covert carbon monoxide (typically 10 ppm) to carbon dioxide and a second, much larger cartridge to remove carbon dioxide (typically in the range of 5,000 ppm). For serial flow, cartridges of two different materials may be installed in series. This would be useful where higher levels of carbon monoxide (100 to 2000 ppm) are present along with carbon dioxide. The first stage (inlet side) can convert carbon monoxide to carbon dioxide and the second stage can remove the carbon dioxide.

The dimensions of the adsorbent cartridge can be tailored for a specific capacity, rate of flow or pressure drop.

Canisters may be resized to drawer dimensions for retrofit into adsorbent systems that use granular drawers, thereby lowering the cost of an adsorbent system upgrade.

4. Deployment of Cartridges

Deployment of a Self-Supported Cartridge

In some embodiments, the rigidly staked cartridge is removed from its protective packaging for installation and operation. The cartridge may be placed into an intermediate holder to guide the insertion of the cartridge into a canister where airflow is directed onto the inlet face of the cartridge. This intermediate holder may incorporate seals on the holder walls to prevent air bypass around the cartridge. The seal does not need to provide additional mechanical force to hold the sheets together, since either the stakes or the combination of stakes and an outer wrap supplies the required force. Front/loading door 17 of canister 10 is opened. The cartridge of adsorbent (with or without an intermediate holder) is inserted into canister 10. The adsorbent cartridge has air inlet and outlet faces 146, 147 of FIG. 15 positioned toward canister inlet 14 and outlet 16. Canister 10 may contain sealing rails on up to four sides to prevent or reduce air from flowing around the cartridge (by-passing).

Figure 16:
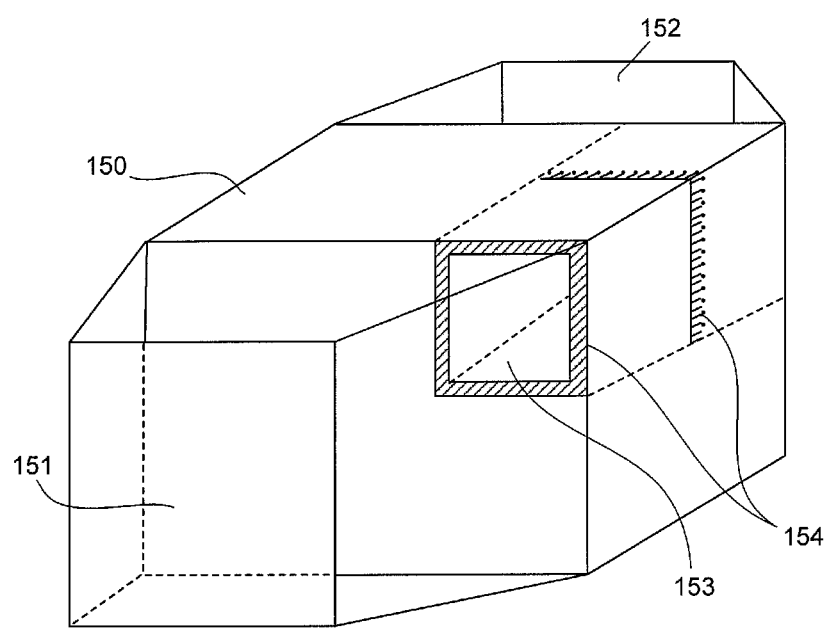
FIG. 16 is a schematic diagram of a $CO_2$ removal system, either a primary or a backup $CO_2$ removal system, that uses self-supported adsorbent cartridges shown in FIG. 15.

In an alternative embodiment, the self-supported cartridge can be inserted onto a seal installed directly in a ventilation system for sealed environments. Examples of such sealed environments are submarines, chemical, biological, radiological, and nuclear (CBRN) shelters, and spacecraft. A flexible polymer seal (such as silicone rubber) seals the cartridge at the inlet edge, or outlet edge or along the side walls. Since the rigidly staked cartridge is self-supporting, it can be installed directly into the chamber and seal mechanism and be fully functional. This application can be used, for example, as a nuclear submarine back up $CO_2$ control, by supplementing or replacing a malfunctioning $CO_2$ removal machine. The rigid adsorbent cartridge can be directly fitted into the ventilation system to remove $CO_2$ from the compartment air. FIG. 16 schematically shows a $CO_2$ removal machine 150 having an inlet 151 that is connected to an emergency ventilation chute 153, which has the capacity to house at least one self-supported cartridge. Emergency ventilation chute 153 is connected to gas outlet 152. Seals 154 are shown in FIG. 16 along the inlet and outlet edges of the chute. During an emergency, a self-supported adsorbent cartridge can be inserted directly into the ventilation chute 153 to function as a backup $CO_2$ removal system.

Deployment of Loosely Secured Staked Cartridge

Figure 17A:
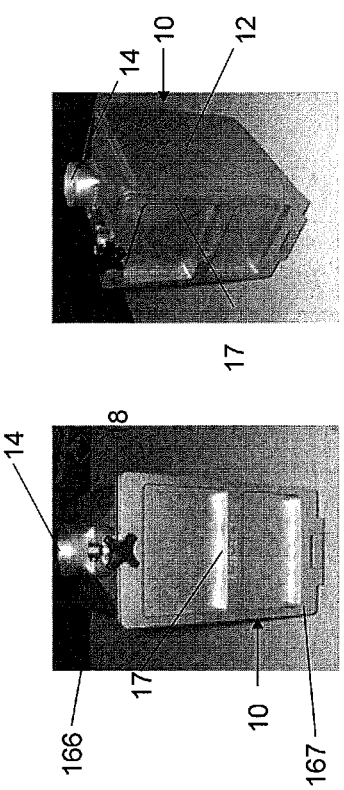
FIG. 17 (a)-(d) shows a more detailed view of an embodiment of the canister of the present invention.
Figure 17C:
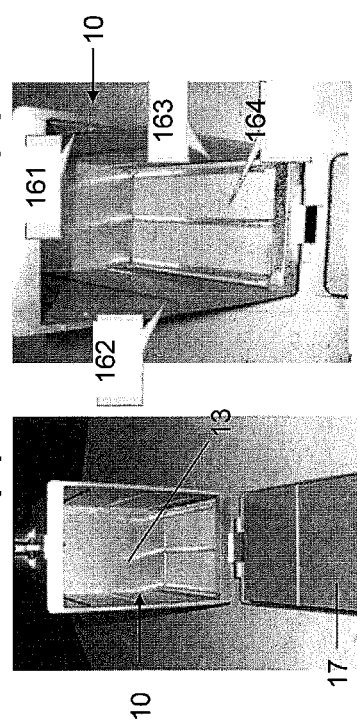
Figure 17B:
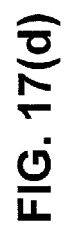
Figure 17D:

In some embodiments, the loosely secured staked cartridge is removed from its protective packaging (for protection from water and $CO_2$ in the air) for installation and operation. Front/loading door 17 of canister 10 (FIG. 17(a)-(d)) is opened. The adsorbent cartridge is pushed into canister 10. In one embodiment, air flows into either the top 166 or bottom 167 of canister 10 and exits on the opposite end of canister 10. The adsorbent cartridge has air inlet face outlet faces positioned toward canister inlet 14 and outlet 16, respectively. As the loosely staked cartridge is pushed into canister 10 it contacts side rails 161, 162 and 163, these side rails push the individual sheets of the adsorbent canister together so that each sheet contacts the adjacent sheets for optimal performance. To ensure the air stream passes through individual channels 131 of FIG. 14 (formed between ribs 33 and adjoining sheet as shown FIG. 14) and does not bypass the adsorbent, in addition to side rails 161-163 of FIG. 17(d) holding the cartridge in shape, canister 10 contains sealing rails on four sides to prevent air from flowing around the cartridge (by-passing). In one embodiment, metal rods are used to form the seals.

The internal design of canister 10 provides a means of applying proper pressure to the stack of adsorbent sheets so that the reactant gas stream properly contacts the adsorbent sheets. By allowing the canister to act as the mechanism for securely holding the adsorbent sheets, the maximum amount of adsorbent can be packaged or stored in a given volume. This high storage density is important in applications with limited space such as submarines and mine shelters. Another advantage of a canister that properly supports the adsorbent is that the adsorbent stack can then be assembled with less costly techniques. Low strength fasteners occupying low volume within the adsorbent can be used to hold the stacked sheets of adsorbent for handling and packaging. Stakes can be used to hold the cartridge of adsorbent sheets providing a practical/cost effective method of stabilizing the stack of adsorbent. When used in combination with the canisters that provides internal structure to support the cartridge, the performance of the adsorbent system is optimized. The combination of staked sheets and structural canister also produces minimal interference with the air flowing in intimate contact with the sheets. When specially designed adsorbent sheet or sheets like those described above (e.g., as sold under the brand name ExtendAir®) are used, problems such as channeling, settling and by-passing are also eliminated. The environmental issue of disposal of the used container is also minimized in the staked cartridge and canister combination.

As shown in FIG. 17(a-d), canister 10 is configured to provide mechanical stability to the adsorbent cartridge by using springs, rods, bars or plates that restrict movement of the adsorbent sheets. The canister's stabilizing elements (161, 162, 163) may be round, triangular or rectangular in cross section and constructed of rigid or flexible material. The canister securely holds the adsorbent sheet(s) so that the process air stream will flow in a uniform fashion through the block of adsorbent. Staking blocks of adsorbent takes very little space inside the adsorbent. This is in contrast to conventional methods of retaining granules inside a container, which require part of the available volume to accommodate said container.

For canister and adsorbent sheet applications, the adsorbent sheets may be adsorbent sheets or granule or powder enclosed in porous sheets. Sheets may also be chemicals/catalyst/adsorbents embedded into fibers and woven into sheets.

The invention will be described in greater detail by way of specific examples. The following examples are offered for illustrative purposes, and are not intended to limit the invention in any manner. Those of skill in the art will readily recognize a variety of non-critical parameters which can be changed or modified to yield essentially the same results.

EXAMPLES

Example 1

Manufacture of a Loosely-Secured Cartridge

A non self-supported cartridge was manufactured using individual sheets of adsorbent cut from a large roll of the adsorbent material. The cartridge was 7.67 inches high by 7.70 inches deep by 5.15 inches wide and included 62 sheets; each sheet is 7.67±0.05 inches by 7.70±0.05 inches by 0.082 inches thick (including sheet and rib height)—the rib is 0.027 inches high and 0.054 inches wide with ribs spaced at 0.116 inches. The sheets were stacked into the cube and a fixture was used to square up the cube. The approximately 62 sheets in the cartridge were loosely secured together by 2 4.75 inch staples driven into the cube ½ inch above the center line (the staples were driven into the top sheet of the cartridge, perpendicular to the gas flow). The 2 staples driven into the adsorbent cartridge provide structural integrity for handling and packaging. The loosely secured staked cartridge of sheets was wrapped in a thin polymer sleeve such that the sleeve did not cover the air inlet and outlet faces of the cartridge. The outer sleeve provided minimal clamping forces to hold the cartridge together.

Example 2

Manufacture of a Canister

FIG. 1(*e*) shows the dimensions of an embodiment of the canister. The canister has a cross-sectional area of 5.23 inch by 7.75 inches and a height of 12.3 inches. The canister is fabricated using 300 series stainless steel. The canister walls were fabricated from a ⅛ inch plate and welded to form a box. Grooves were cut in 2 places on 2 sides to mount the side bars (FIGS. 17(*d*) 161 and 163). On the front, both sides and rear walls, a groove was cut at the center line to mount the seal bars (FIG. 17(*d*) 162). The front frame was machined from an approximately ½ inch plate and welded to the side walls. The door was machined from a thick (approximately ¾ inch) plate and attached with a hinge to the front frame. A groove was machined into the door to accommodate an o-ring seal. This o-ring sat against the machined surface of the door frame. The top and bottom transition pieces were made from 20 gauge stainless steel and were welded onto the side walls, front frame and rear wall. A series of fine mesh screens (FIG. 17(*d*) 164) were installed into the inlet and outlet plenums inside the canister. The screens were identical to allow flow in either direction. A flat disc 1.25 inches in diameter (hovering plate) was mounted in the center of the inlet and outlet flow passages. The combination of the flat disc (floating disc) and the screens produced uniform flow across the adsorbent. Because the screens and discs were the same at both ends, flow direction may be reversed with no performance change.

The canister and adsorbent cartridge combination provides 33% more material in a volume equal to the existing granule containers used in conventional systems. The canister and adsorbent cartridge combination has 79% less pressure drop than 8 to 12 mesh granules when operated at 200 liters per minute airflow. The reduced pressure drop enables improved performance either through increased airflow or reduced power or both. TABLE 1 shows the change in gas pressure at different gas flow rates for both the adsorbent cartridge system (using the 62 sheet cartridge that occupies the same storage volume as the 8-12 mesh granule container) and the conventional granular adsorbent systems.

TABLE 1

Drop in pressure as a function of different flow rates for a system using the disclosed adsorbent cartridge and a conventional granular adsorbent system.

| | Flow rate (slpm) | | | | |
|---|---|---|---|---|---|
| | 100 | 150 | 200 | 250 | 300 |
| Cube-shaped adsorbent cartridge dP (Pascals) | 56 | 77 | 115 | 138 | 174 |
| Granule dP (Pascals) | | 461 | 563 | | |

The adsorbent cartridge was a loosely staked 62 sheet cartridge described in Example (1) installed in a canister described in Example (2). The granules were 8-12 mesh tested in the plastic container supplied for submarine applications.

Figure 19:
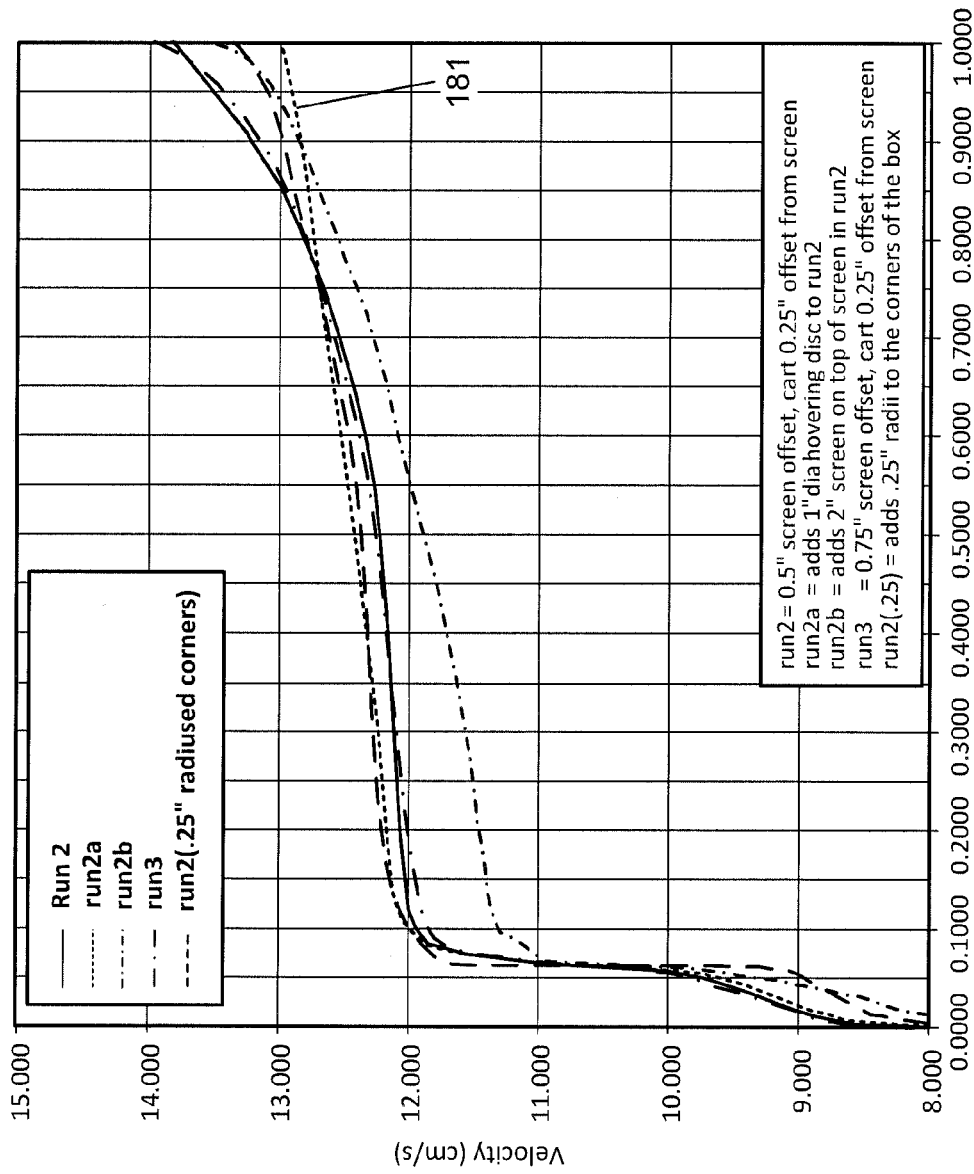
FIG. 19 shows a graph of flow distribution through the cartridge using different flow distributors for uniform flow.

The fluid (e.g. gas) flow of the adsorbent system has been modeled in order to design an optimal flow distribution system. The flow distribution system includes a stainless steel plate (referred to as a hovering plate) that limits the gas flow through the center region of the cartridge, and instead forces the airflow to be uniformly distributed across the entire cross-sectional area of the cartridge. The flow distribution system also includes a woven screen placed upstream from the stainless steel plate. FIG. 19 shows a graph of flow distribution through the cartridge using different flow distributors/diffusion panels for uniform flow. The flow velocity in cm/s is plotted against the amount of flow in the system (i.e. 1.0 is equivalent to 100%). The results shown for Run 2*a* is obtained from a flow distribution system with a hovering plate, a screen offset of 0.5 inch and an adsorbent cartridge mounted 0.25 inches above the screen yielded the best result from the flow model. The curve 181 depicts the result obtained from Run 2*a*. Small rails on the flow distribution screen keep the cartridge ¼ inch above the screen. The hovering disc is welded in place and the screens are fixed into the canister thus keeping the disc to screen separation at 0.5 inches. In this case, 90% of the flow has a flow velocity between 10 and 12 cm/s.

Figure 20:
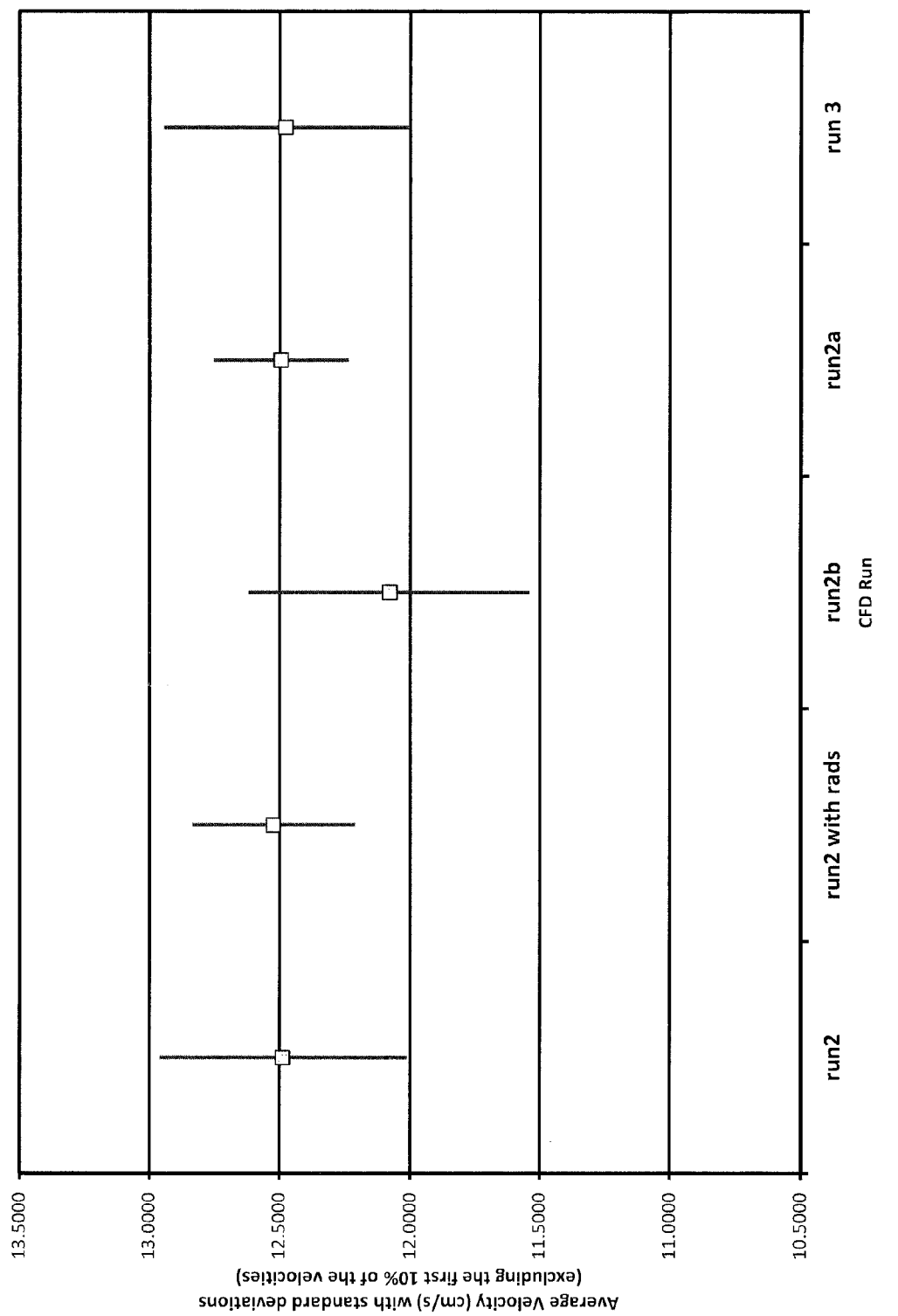
FIG. 20 summarizes the results shown in FIG. 19 using mean velocities and their standard deviations from different runs.

FIG. 20 uses the information presented in the graphs shown in FIG. 19 and displays the data as average velocities (solid squares) and their associated standard deviations (vertical lines through the solid squares). The length of the vertical lines is proportional to the magnitude of the standard deviation. Run 2*a* has the smallest standard deviation, which provides another indication of uniform airflow.

Figure 21:
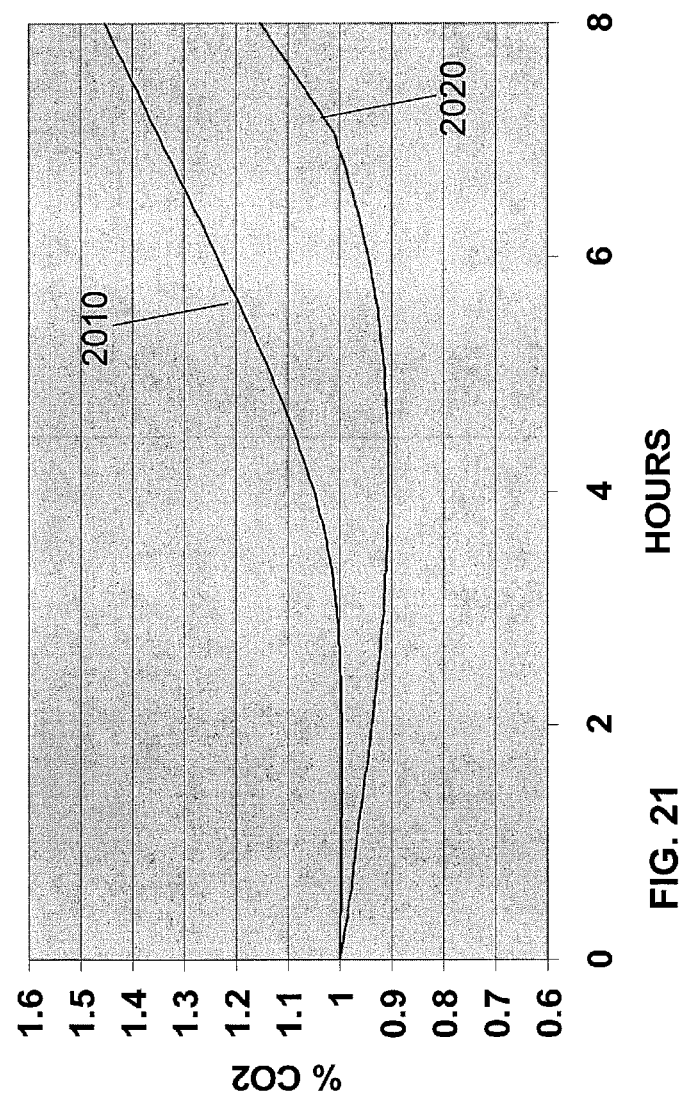
FIG. 21 shows results obtained from modeling adsorbent system performance in a submarine.
Figure 22:
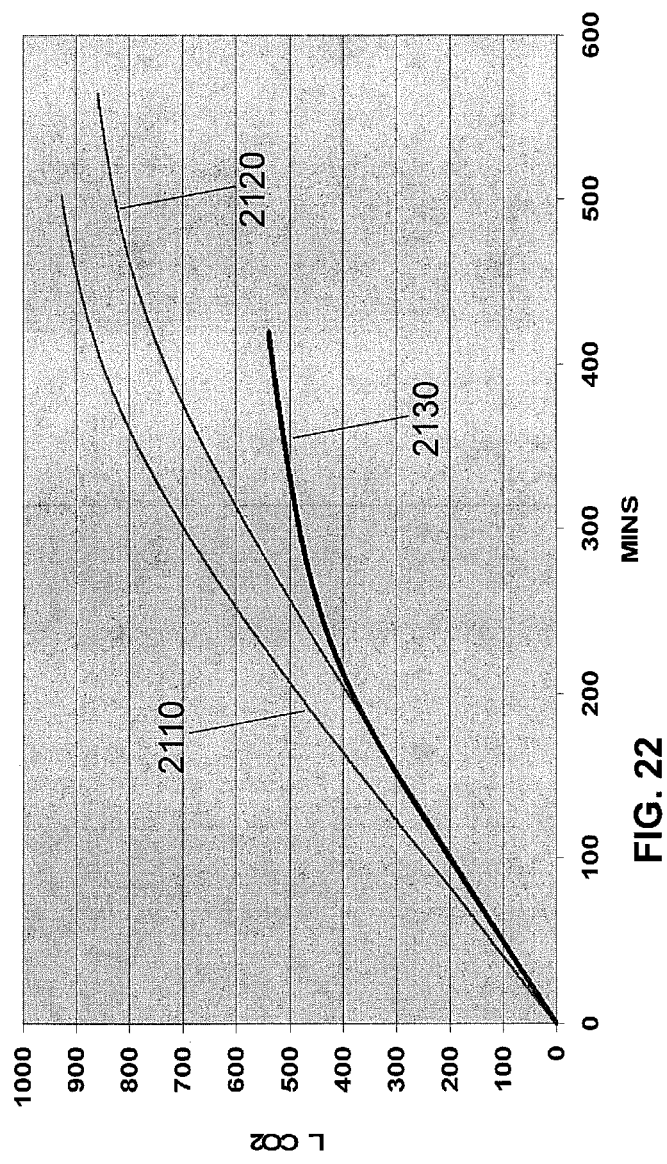
FIG. 22 compares the capacity of $CO_2$ removed by different adsorbent systems as a function of time.
Figure 23:
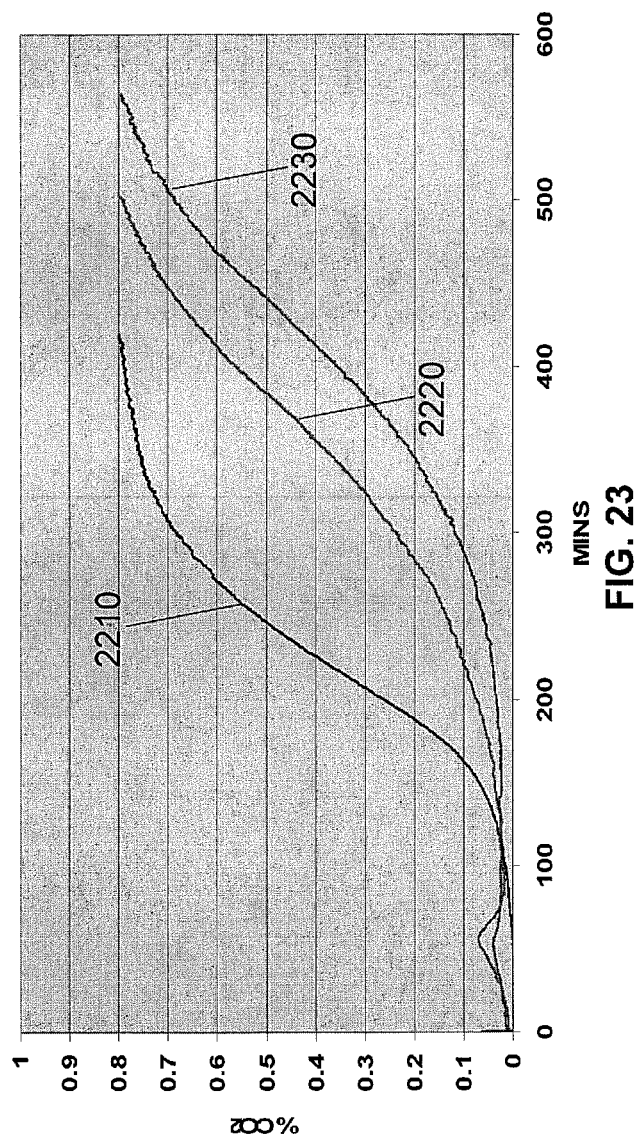
FIG. 23 shows the performance of the present invention in terms of the concentrations of $CO_2$ at the outlet of the removal system as a function of time.

FIGS. 21-23 show results from adsorbent modeling and testing. FIG. 21 shows the results obtained from modeling the adsorbent system performance in a submarine. The disclosed adsorbent system (shown by curve 2020) outperforms the conventional granular adsorbent system by maintaining the $CO_2$ concentration in air to less than 1.0% for a duration of 6 hours at a flow rate of 250 standard liters per minute (slpm), whereas the conventional system (denoted by curve 2010) cannot maintain that level of $CO_2$ for more than 2.5 hours at a lower flow rate of 200 slpm. FIG. 22 compares the capacity (in liters, L) of $CO_2$ removed by the adsorbent systems as a function of time. Curves 2110 and 2120 show the volume of $CO_2$ removed by the disclosed system operating at a flow rate of 250 slpm and 200 slpm respectively, outperforming the conventional system operating at a flow rate of 200 slpm, represented by curve 2130. FIG. 23 shows the performance of the disclosed system in terms of the concentration of $CO_2$ as a function of time. Curves 2220 and 2230 show the disclosed system operating at a flow rate of 250 slpm and 200 slpm respectively, outperforming the conventional system (represented by curve 2210) operating at a flow rate of 200 slpm. The disclosed system is able to keep the $CO_2$ level below a set level for a longer period of time than the conventional system.

A number of embodiments of the invention have been described. Nevertheless, it will be understood that various modifications may be made without departing from the spirit and scope of the invention. Accordingly, other embodiments are within the scope of the following claims.

What is claimed is:

1. A removable adsorbent cartridge for removal of gaseous contaminants comprising:
   a plurality of parallel, non-wound adsorbent sheets, mechanically spaced so as to allow gas flow between each sheet in the plurality, wherein each adsorbent sheet is formed from a mixture comprising a polymer and an adsorbent, wherein the sheets are spaced by ribs protruding from each sheet and molded directly out of the adsorbent sheet; and
   one or more fasteners disposed within the adsorbent cartridge, wherein the one or more fasteners secures the plurality of said sheets together; wherein the cartridge does not further comprise a rigid shell encasing the cartridge; and wherein the cartridge is self-supporting without the need for external support or gluing or fusing the sheets together.

2. The adsorbent cartridge of claim 1, wherein the non-wound adsorbent sheets are planar.

3. The adsorbent cartridge of claim 1, wherein the one or more fasteners comprise one or more fasteners independently selected from stakes, staples, wires, rods, cords, plastic bands, elastic bands, and rivets.

4. The adsorbent cartridge of claim 1, wherein the one or more fasteners comprise one or more rigid stakes disposed within the cartridge, entering the cartridge from the top or bottom surface sheet.

5. The adsorbent cartridge of claim 4, wherein the rigid stakes are arranged perpendicular to the gas flow.

6. The adsorbent cartridge of claim 4, wherein the rigid stakes are arranged at an angle to the gas flow.

7. The adsorbent cartridge of claim 4, wherein the one or more fasteners comprise a plurality of rigid stakes arranged within the adsorbent cartridge to fasten the adsorbent sheets such that no additional external mechanical support is required during use when the adsorbent cartridge is subjected to a gas flow.

8. The absorbent cartridge of claim 1, wherein the fasteners secure the absorbent sheets together for transport, but additional mechanical support is required during use when the absorbent cartridge is subjected to gas flow.

9. The adsorbent cartridge of claim 1, further comprising a polymer foam that seals the outer surface of the cartridge along the sides that are not in the inlet or outlet flow stream.

10. The adsorbent cartridge of claim 1, further comprising a polymer sleeve surrounding the outer surface of the cartridge along the sides that are not in the inlet or outlet flow stream.

11. The adsorbent cartridge of claim 1, wherein the cartridge comprises square adsorbent sheets arranged into a cube.

12. The adsorbent cartridge of claim 1, wherein the cartridge comprises rectangular adsorbent sheets arranged into a rectangular stack.

13. The adsorbent cartridge of claim 1, wherein the cartridge comprises round or oval adsorbent sheets arranged into a cylinder.

14. The adsorbent cartridge of claim 1, wherein the cartridge comprises triangular or trapezoidal sheets.

15. The adsorbent cartridge of claim 1, wherein said gaseous contaminant is carbon dioxide.

16. The adsorbent cartridge of claim 1, wherein said gaseous contaminant is carbon monoxide, chemical or biological toxins, volatile organic carbons, moisture, acid gases or other impurities in the feed gas stream.

17. The adsorbent cartridge of claim 1, wherein the adsorbent is selected from the group consisting of calcium hydroxide and lithium hydroxide.

18. The adsorbent cartridge of claim 1, wherein the adsorbent material is molecular sieves, activated carbon, or an oxidation catalyst.

19. The cartridge of claim 1, wherein the sheets are extruded sheets.

20. The cartridge of claim 1, wherein the one or more fasteners are two staples.

21. A gaseous contaminant removal system comprising:
   (1) a removable adsorbent cartridge comprising:
   a plurality of parallel, non-wound adsorbent sheets, mechanically spaced so as to allow gas flow between each sheet in the plurality, wherein each adsorbent sheet is formed from a mixture comprising a polymer and an adsorbent, wherein the sheets are spaced by ribs protruding from each sheet and molded directly out of the adsorbent sheet; and
   one or more fasteners, wherein the one or more fasteners secures the plurality of said sheets together; wherein the cartridge does not further comprise a rigid shell encasing the cartridge; and
   (2) a canister comprising:
   an inlet through which gas can flow to contact the adsorbent cartridge;
   an outlet for gas flow; and
   a plurality of support structures disposed on the interior walls of the canister, which provide mechanical stability to the adsorbent cartridge by restricting movement of the cartridge within the canister during use;
   wherein the cartridge is placed in the canister such that the gas flow from the inlet of the canister can flow between the adsorbent surfaces in said cartridge.

* * * * *